3,586,674
Patented June 22, 1971

3,586,674
ORGANOMETALLIC DERIVATIVES OF 6-LOWER ALKOXY 1-PHENAZINOL 5,10-DIOXIDE
Willy Leimgruber, Montclair, N.J., Gian Paolo Maestrone, Staten Island, N.Y., and Milan Mitrovic, Nutley, and Manfred Weigele, North Caldwell, N.J., assignors to Hoffmann-La Roche Inc., Nutley, N.J.
No Drawing. Continuation-in-part of abandoned application Ser. No. 739,191, June 24, 1968. This application Apr. 8, 1969, Ser. No. 814,429
Int. Cl. C07d 51/80
U.S. Cl. 260—242          5 Claims

ABSTRACT OF THE DISCLOSURE

Copper derivatives of 6-lower alkoxy-1-phenazinol 5,10-dioxide prepared by treating a 6-lower alkoxy-1-phenazinol 5,10-dioxide with a copper salt possess broad spectrum anti-microbial activity.

RELATED APPLICATION

This application is a continuation-in-part of U.S. patent application Ser. No. 739,191, filed June 24, 1968, now abandoned, the benefit of the date of which is hereby claimed.

BRIEF DESCRIPTION OF THE INVENTION

This invention relates to organometallic complexes of the formula

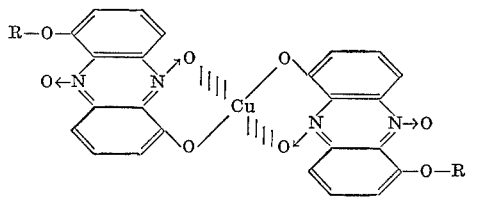

I wherein R is lower alkyl, preferably methyl, ethyl or propyl, to compositions containing an organometallic complex of Formula I and to the use of such organometallic complexes in the treatment of pathologic diseases caused by microbial infections.

DETAILED DESCRIPTION OF THE INVENTION

In particular, this invention relates to novel copper (II) complexes formed from a 6-lower alkoxy-1-phenazinol 5,10-dioxide and a copper (II) salt. The preferred compound is a cupric complex of 6 - methoxy - 1 - phenazinol 5,10-dioxide.

The novel compounds of this invention, i.e., the cupric complexes of Formula I are prepared by combining a solution of a 6-lower alkoxy-1-phenazinol 5,10-dioxide with a solution of a cupric salt. The cupric complex can be isolated as crystals by precipitation from the mother liquors. The selection of a suitable solvent for the reactants is made by determining the relative solubilities which can be readily done by those of ordinary skill in the art. As the solvent, it is preferred to utilize a solvent in which both the 6-lower alkoxy-1-phenazinol 5,10-dioxide and the cupric salt reagents are more soluble than the complex reaction product formed therefrom. Exemplary solvents which can be conveniently employed are the inert organic solvents such as acetonitrile, dimethylformamide, dioxane, etc. Any cupric salt can be employed as starting material. However, since in the formation of the cupric complex of Formula I there is also formed the acid corresponding to the anionic moiety of the cupric salts and the cupric complex is less stable under strongly acidic conditions, it is preferred to utilize a cupric salt of a weak acid. As a suitable cupric salt there can be utilized a cupric salt formed from any of the weak acids, e.g., acids having a pKa of about 4.2 or greater. Exemplary acids answering this description are the organic acids such as the lower alkanoic acids, e.g., acetic acid, propionic acid, etc., benzoic acid and the like. There can also be employed cupric salts of mineral acids such as, for example, cupric sulfate. When employing a mineral acid salt it is preferred to utilize a buffered solvent system in order to avoid highly acidic conditions. The cupric complex of Formula I can be readily prepared by simply combining a saturated solution of the 6-lower alkoxy-1-phenazinol 5,10-dioxide starting material in a suitable solvent with a saturated solution of a cupric salt in the same solvent at room temperature and separating the cupric complex which precipitates. Temperatures above room temperature can be employed in order to facilitate the solution and thereby reduce the amount of solvent needed. The precipitation of the complex can also be facilitated by cooling. The separation of the precipitated crystalline complex is accomplished by the usual techniques for solvent removal such as, for example, by filtration, solvent displacement followed by filtration, etc.

The 6-lower alkoxy-1-phenazinol 5,10-dioxide starting materials employed in the preparation of the copper complexes of this invention are known compounds or analogs which can be readily prepared by selectively alkylating the known compound 1,6-phenazinol 5,10-dioxide (iodinin). The selective alkylation can be readily accomplished by treating 1,6-phenazinediol 5,10-dioxide with an alkylating agent such as di-lower alkylsulfate in the presence of an aqueous alkali such as sodium hydroxide followed by treatment with an alkylating agent. This process in its preferred mode is accomplished by first preparing the sodium salt of the 1,6-phenazinediol 5,10-dioxide and thereafter treating with an alkylating agent in a non-aqueous solvent.

The novel cupric complexes of Formula I have been found to possess broad spectrum anti-microbial activity. In particular, the cupric complex of 6-methoxy-1-phenazinol 5,10-dioxide has demonstrated a high level of activity against a wide variety of both Gram-positive and Gram-negative bacteria such as *Streptococcus pyrogenes, Streptococcus agalactiae, Diplococcus pneumoniae, Staphylococcus aureus, Escherichia coli, Klebsiella pneumoniae, Proteus vulgaris, Pseudomonas aeruginosa, Salmonella typhosa, Salmonella schottmuelleri, Pasteurella multocida, Moraxella bovis, Erysipelothrix insidiosa, Mycobacterium tuberculosis* and *Mycoplasma gallisepticum*. They are also active against fungi and yeast such as *Candida albicans, Trichophyton mentagrophytes, Microsporum canis, Microsporum audouini, Ustilago zeae, Fusarium oxysporum, Botrytis paeoniae. Aspergillus flavus* and *Aspergillus niger*; against protozoa such as *Trichomonas vaginalis* and *Trichomonas foetus;* and against helminths such as *Syphacia obvelata* and *Ascaris suum*. The novel cupric complexes of this invention are also active against plant pathogens and can be employed as foliar fungicides or soil fungicides. These compounds have, for example, demonstrated a high degree of activity against *Phytophthora infestans*, the causative organism in late blight of tomatoes and against *Xanthomonas vesicatoria*, the causative agent of bacterial leaf spot of tomatoes and against *Piricularia oryzae*, the pathogen associated with rice blast.

The novel compounds of this invention are particularly useful in the treatment of plant and animal diseases of microbial origin by virtue of their low mammalian and phytotoxicity. When the novel compounds of this invention are employed in the treatment of microbial, helminth and/or protozoal infections as well as ectoparasitic infections or infestations, they are conveniently utilized in composition with suitable carrier materials for use as chemotherapeutic agents in combating mammalian diseases. They are formulated by uniformly distributing in a vehicle that is chemically compatible with the particular compound selected and are non-inhibiting with respect to the active ingredient and essentially non-injurious to body tissue under the conditions of use. When formulated into compositions suitable for topical administration, the novel compounds of Formula I are preferably employed in amounts ranging from about 0.1 to about 0.5% by weight of the chemotherapeutic composition, e.g., gel, cream, ointment, suspensions, suppository or the like. It will be understood that the compounds of this invention when employed in forms suitable for topical administration, may be utilized in diverse formulations: for example, solid formulations including finely divided powders and granular materials; liquid formulations including suspensions, concentrations, slurries, tinctures, aerosols and the like, depending on the application intended and the formulation media desired. They may be employed as creams, gels, jellies, ointments, pastes, etc. When utilizing formulations in which the compounds of this invention have partial solubility, e.g., those containing propylene glycol, the molar ratio of the myxin and copper changes in the dissolved complex since some of the materials present, e.g., solvent, can act as a ligand. This invention is intended to include such compositions.

A still further aspect of this invention involves the use of the novel cupric complexes for a variety of industrial anti-microbial applications. Thus, the chemical, physical and biological properties of these complexes make them suitable for the following uses: mildew proofing fabrics such as textiles, canvas and other woven and non-woven materials; as paint fungicides; as a fuel additive for the control of microbial growth; as preservative agents for clothes and shoes; as topical antiseptics; as disinfectant agents; plant and tree spray, anti-mycotic agents for soaps; mildrew proofing agents in plastics, cardboard, fiberboard, paper, etc.; slimicides in pulp liquors, etc.; food preservatives; additives for soaps and detergents, etc.; additives in cosmetics, shampoos, deodorants, mouth washes, etc.

In one of its more particular aspects, the cupric complexes of this invention, particularly the compound 6-methoxy-1-phenazinol 5,10-dioxide, cupric complex, have demonstrated a remarkably high degree of activity both in vitro and in vivo against pathogens, particularly the bacteria and yeasts which are the etiologic agents of bovine mastitis. Known anti-mastitis agents are not completely satisfactory since their effectiveness is limited by their having relatively narrow spectra of anti-microbial activity and also by the fact that they may cause irritation. Thus, the compounds of this invention, owing to their potent broad spectrum anti-microbial activity and their non-irritating properties, are particularly effective as anti-mastitis agents. The compounds, especially 6-methoxy-1-phenazinol 5,10-dioxide, cupric complex, have been found in actual application to the udder of ruminants, especially cows, to be non-irritating, potent anti-mastitis agents. The compounds of Formula I when used as anti-mastitis agents can be applied directly to the udder of the animal by topical administration, e.g., inserts, or by intramammary infusion.

Thus, in a more specific embodiment this invention comprises the use of a compound of Formula I as an anti-mastitis agent and compositions comprising a compound of Formula I together with carrier materials suitable for topical or intramammary administration. For use as anti-mastitis agents the compounds of Formula I are effectively employed in amounts between about 5 mg. and about 50 mg. per dose administered twice daily for about one or two days or until a therapeutic response is obtained which can occur even after a single administration. A preferred dosage range is between about 5 and 40 mg. per dose administered in a suitable vehicle in 20 ml. dose amounts. The optimal dose is a single dose containing 20 mg. of active substance.

Intramammary infusion preparations typically contain oil dispersible or water dispersible vehicles. The vehicles are composed of inert ingredients, e.g., surface active agents, anti-oxidants and the like with vegetable oil or water carriers. Typical ingredients which are pharmaceutically acceptable for use in compositions used for intramammary infusion administration are sodium citrate, citric acid, magnesium almium silicate (Veegum K), carboxymethyl cellulose, Tween 80, sorbitol, glycerin, microcrystalline cellulose (Avicel), propylene glycol, benzyl alcohol, polyoxyethylene 20-sodium monostearate (Tween 60), BHA, BHT, lecithin, finely divided silica (Cab-O-Sil), hydrogenated castor oil (12 Hydroxy Stearin), methyl paraben, propyl paraben, chlorbutanol, aluminum monostearate, sorbitan monostearate (Span 60), modified 1-hydroxy stearin (Thixcin R), glycerol monostearate, polyoxyethylene sorbitol tristearate, Freon 12, Freon 14 and dimethyl polysiloxane.

In vivo tests on mice infected with mastitis isolates have been shown to demonstrate the anti-mastitis effectiveness of known antimastitis agents and such in vivo test results have been well correlated with antimastitis activity in animals susceptible to mastitis infections, e.g., dairy cows. The test procedure involves determination of activity in the presence of milk to insure effectiveness in the presence of organic fluids. The invivo test method employed in the determination of the anti-mastitis activity of the compounds of Formula I is as follows:

MATERIAL AND METHODS

Medium

Sterile milk containing less than 1 bacteria/5 ml. is prepared.

Cultures

Bacterial strains used to contaminate the milk are field isolates of bovine mastitis and are maintained on tryptose agar. Twenty-four hours growth on tryptose agar is used for contaminating the milk. The final concentrations of the organisms in the milk are as follows:

(a) *Streptococcus agalactiae*—$5 \times 10^7$ organisms per ml.
(b) *Staphylococcus aureus*—$2 \times 10^9$ organisms per ml.
(c) *Escherichia coli*—$2 \times 10^9$ organisms per ml.
(d) *Pseudomonas aeruginosa*—$5 \times 10^8$ organisms per ml.

The subcutaneous injection into 18 to 20 gram mice of 0.5 ml. of milk contaminated with the strains indicated above induces lesions. The mice to be infected with *Streptococcus agalactiae* are preconditioned with triamcinolone acetonide in order to show well defined lesions.

TESTING PROCEDURE

A 50 mg. amount of 6-methoxy-1-phenazinol 5,10-dioxide, cupric complex is ground into 10 ml. of sterile distilled water, pH 7 to 7.2, using a Teflon grinder and further dilutions containing 1, 0.2, 0.04 and 0.008 mg. of compound per ml. are prepared in sterile distilled water. A 0.5 ml. amount of each dilution of the compound is added to a tube containing 4.5 ml. of contaminated milk (1 tube/dilution) so that the final concentrations of the compound in the milk are 500, 100, 20, 4 and 0.8 micrograms per ml. After vigorous shaking to assure a uniform distribution of the compound throughout the milk, 0.5 ml. of each combination (contaminated milk plus compound) is injected subcutaneously into 4 white mice of 18 to 20 gram weight. Normal mice are used for the Staphylococcus, Coli and Pseudomonas infections while preconditioned mice (injected subcutaneously 24 hours in advance with 1 mg. of triamcinolone acetonide) are used for the Streptococcus infection. Each group of mice is kept in a separate cage and receives normal pelleted food and water ad libitum. The animals ar observed twice a day for two days after injection and sacrified on the third day. A record is kept for signs and deaths. An autopsy is performed on all mice which die during test and on all survivors sacrificed on the third day of the test. Activity of the compound against the 4 bacterial strains is evaluated as follows: Streptococcus—absence of pus and necrosis at the site of the injection; Staphylococcus—absence of necrosis at the site of the injection and lack of signs and death; Coli—absence of heavy fibrinous infiltration at the site of the injection; Pseudomonas—absence of gelatinous edema and necrosis at the site of injection, lack of signs and death.

CONTROLS

Controls are run with every test to establish:

(1) sterility of milk, saline and distilled water used in the test;
(2) bacterial count of the contaminated milk;
(3) purity of the strains used to contaminate the milk;
(4) titration of the infecting inoculum in mice;
(5) lack of pathogenic effect of non-contaminated milk.

EVALUATION OF THE RESULTS

Using the method described, the following criteria and parameters are obtained:

(1) protection of animals from local lesions induced by inoculation of milk contaminated with *Streptococcus agalactiae, Staphylococcus aureus, Escherichia coli* and *Pseudomonas aeruginosa;*
(2) protection from death and clinical symptoms induced by Staphylococcus and Pseudomonas.

RESULTS

Using this procedure, the activity of the anti-mastitis formulations is established against four strains of bacteria. The folowing are the results of the testing of an exemplary compound useful in the compositions of this invention. Tables I and II show the anti-bacterial efficacy both in vitro and in vivo.

TABLE I.—IN VITRO ACTIVITY OF 6-ALKOXY-1-PHENAZINOL 5,10-DIOXIDE, CUPRIC COMPLEXES

| Orgnaism | Minimum inhibitory concentration | |
| --- | --- | --- |
| | 6-methoxy-1-phenazinol 5,10-dioxide, cupric complex | 6-ethoxy-1-phenazinol 5,10-dioxide, curpic complex |
| *Streptococcus agalactiae* | <0.16 | <4 |
| *Staphylococcus aureus* | 0.16 | <4 |
| *Escherichia coli* | 2.4 | 20 |
| *Pseudomonas aeruginosa* | 12 | 100 |

TABLE II

| Compound | In vivo anti-bacterial activity as $ED_{50}$ mcg./ml. | | | |
| --- | --- | --- | --- | --- |
| | S. agalactiae | S. aureus | E. coli | P. aeruginosa |
| 6-methoxy-1-phenazinol 5,10-dioxide, cupric complex | 0.8 | 60 | 12 | 60 |

In addition to their use as anti-mastitis agents, the compounds of Formula I are useful in the treatment of a wide variety of animal and plant infections. The compounds of Formula I have been found to be particularly useful in the treatment of localized animal infections caused by a variety of organisms. The novel cupric complexes of this invention can be effectively employed in medical therapy such as the treatment of bacterial, yeast and/or mycotic infections of man and animals where the skin, hair, nails and/or other areas of the body are infected.

Thus, in still another of its specific embodiments this invention involves the use of compounds of Formula I and novel compositions containing these compounds for the treatment of infections of the skin, ear, eye and genitals of animals. Thus, the anti-bacterial activity of these compounds against skin infections caused by *Staphylococcus aureus* and *Pseudomonas aeruginosa* has been shown by the following in vivo tests.

ANTI-BACTERIAL ACTIVITY

Scarification of rabbit skin followed by infection with *Staphylococcus aureus* and *Pseudomonas aeruginosa*. Two rabbits/infection. Treatment—4 days, total treatments—7. Therapeutic efficacy is obtained by compounding clinical observations after 1, 2 and 3 days of treatment and 3 days after the end of treatment and comparing the treated with the non-treated and the placebo-treated areas.

| Compound | Therapeutic efficacy, percent | |
| --- | --- | --- |
| | S. aureus | P. aeruginosa |
| 6-methoxy-1-phenazinol 5,10-dioxide, cupric complex: | | |
| 0.5 percent | 70 | 48 |
| 0.1 percent | 57 | 78 |

The activity against yeast has been demonstrated by the following test in animals.

New Zealand white rabbits conditioned with triamcinolone acetonide were infected by scarification with a strain of *Candida albicans* and treated for two cycles of 5 days with experimental formulations. Therapeutic efficacy is evaluated by scoring the lesions for improvement at weekly intervals and comparing the treated with the non-treated and placebo-treated areas of the skin.

| Compound | Percent | Therapeutic efficacy, percent | | |
| --- | --- | --- | --- | --- |
| | | 1-week treatment | 2-week treatment | 1 week after treatment |
| 6-methoxy-1-phenazinol 5,10-dioxide, cupric complex—gel | 0.5 | 73 | 58 | 100 |
| | 0.1 | 47 | 34 | 45 |
| | 0.02 | 60 | 92 | 89 |
| Gel placebo | | 40 | 0 | 11 |
| 6-methoxy-1-phenazinol 5,10-dioxide, cupric complex—cream | 0.1 | 50 | 44 | 33 |
| Cream placebo | | 33 | 22 | 12 |
| 6-methoxy-1-phenazinol 5,10-dioxide, cupric complex in petrolatum base | 0.5 | 74 | 89 | 103 |
| Petrolatum placebo | | 40 | 11 | 30 |

Anti-fungal activity has been demonstrated in animals by the following test.

Albino guinea pigs conditioned with triamcinolone acetonide were infected by multiple stabbing with a spore suspension of *Trichophyton mentagrophytes* and treated for two cycles of 5 days with experimental formulations. Therapeutic efficacy is evaluated by scoring the lesions for clinical improvement at weekly intervals and comparing the treated with the non-treated and placebo-treated areas of the skin.

ANTI-TRICHOPHYTON MENTAGROPHYTES ACTIVITY

| Compound | Percent | Therapeutic efficacy, percent | | |
| --- | --- | --- | --- | --- |
| | | 2-week treatment | 1 week after treatment | 2 weeks after treatment |
| 6-methoxy-1-phenazinol 5,10-dioxide, cupric complex—gel | 0.5 | 96 | 99.5 | 98.5 |
| | 0.1 | 75 | 77 | 71 |
| | 0.05 | 65 | 65 | 61 |
| 6-methoxy-1-phenazinol 5,10-dioxide, cupric complex—cream | 0.5 | 87 | 86 | 94 |
| | 0.1 | 42 | 82 | 81 |
| Cream placebo | | 23 | 6 | 32 |
| 6-methoxy-1-phenazinol 5,10-dioxide, cupric complex in petrolatum base | 0.5 | 78 | 89 | 79 |
| Petrolatum placebo | | −11 | −20 | −30 |

Foliar fungicide activity of the novel complexes of this invention has been demonstrated in standard tests for foliar fungicide activity. Exemplary results of such tests with 6-methoxy-1-phenazinol 5,10-dioxide, cupric complex are shown in the following table.

| Compound | Concentration (p.p.m.) | Plant pathogen | Percent control: plant injury [1] |
|---|---|---|---|
| 6-methoxy-1-phenazinol 5,10-dioxide, cupric complex. | 100 | Phytophthora infestans_____<br>Xanthomonas vesicatoria___<br>Pirieularia oryzae_____ | 74:0<br>82:0<br>66:0 |

[1] 0 indicates no visible effect.

The activity against protozoa has been demonstrated by the following tests in animals infected with *Trichomonas vaginalis*:

Groups of 7 to 8 albino mice weighing 18 to 20 grams were infected subcutaneously on the abdominal surface with approximately 500,000 cells. The animals were treated by infiltration into the site of infection with dose levels of the compounds of Formula I of from 2 mcg. to 1000 mcg. per ml. of solution on the day of the infection and the day after infection. The mice were examined the third day after infection for lesions at the site of the infection. The number of animals with lesions and the number of lesion-free animals were determined for each dose level tested.

The $CD_{50}$ was calculated using the method of Reed and Muench [American Journal Hygiene, vol. 27, page 493 (1938)].

| Compound | Dose, mcg./ml. s.c. | No lesion | Lesion | Cumulative No lesion | Cumulative Lesion |
|---|---|---|---|---|---|
| 6-methoxy-1-phenazinol 5,10-dioxide, cupric complex_____ | 1,000 | 35 | 5 | 121 | 5 |
|  | 400 | 22 | 10 | 86 | 15 |
|  | 200 | 19 | 12 | 64 | 27 |
|  | 100 | 11 | 5 | 45 | 32 |
|  | 40 | 11 | 5 | 34 | 37 |
|  | 20 | 11 | 5 | 23 | 42 |
|  | 10 | 7 | 1 | 12 | 43 |
|  | 4 | 3 | 5 | 5 | 48 |
|  | 2 | 2 | 6 | 2 | 54 |

The $CD_{50}$ is 48 mcg./ml. s.c. based upon the data from the tests.

EXAMPLE 1

Preparation of 6-methoxy-1-phenazinol 5,10-dioxide, cupric complex

To a solution of 6 g. of 6-methoxy-1-phenazinol 5,10-dioxide in 3 l. of acetonitrile was added with stirring a 75° C. solution of 3 g. cupric acetate monohydrate in 900 ml. acetonitrile. The mixture was allowed to cool and was kept at room temperature for 3 hours. The precipitated cupric complex was collected by filtration and washed thoroughly on the filter, first with acetonitrile and then with ether. Thus, 6.1 g. of the complex were obtained in the form of dark green, fine crystals. Pertinent absorption bands in the IR spectrum: 1365 cm.$^{-1}$ (in Fluorolube); 1059, 776, 578 cm.$^{-1}$ (in Nujol). U.V. absorption maxima in DMSO:

287 m$\mu$—($\epsilon$=68,500)
300 m$\mu$—($\epsilon$=63,200)
356 m$\mu$—($\epsilon$=10,000)
408 m$\mu$—($\epsilon$=10,400)
610 m$\mu$—($\epsilon$=9,500)

*Analysis.*—Calculated for $C_{26}H_{18}N_4O_8Cu$ (percent): C, 54.03; H, 3.14; N, 9.69; Cu, 10.99. Found (percent): C, 53.71; H, 3.31; N, 9.66; Cu, 10.92.

EXAMPLE 2

In analogy to the procedure described in Example 1 above, there was also prepared 6-ethoxy-1-phenazinol 5,10-dioxide, cupric complex starting with 6-ethoxy-1-phenazinol 5,10-dioxide.

*Analysis.*—Calculated for $C_{28}H_{22}N_4O_8Cu$ (percent): N, 9.25. Found (percent): N, 9.12.

6-propoxy-1-phenazinol 5,10-dioxide cupric complex can be prepared also following the procedure described in Example 1 and utilizing as the starting material 6-propoxy-1-phenazinol 5,10-dioxide.

EXAMPLE 3

A 6 ml. suspension is prepared by mixing together the following:

| | Mg. |
|---|---|
| 6-methoxy-1-phenazinol 5,10-dioxide, cupric complex | 10 |
| Ethylenediamine | 57 |
| Distilled monoglycerides | 60 |
| Polyethylene glycol 400 (U.S.P.), q.s. | |

Infuse 6 ml. into teat canal of each infected quarter. Repeat in 12 and/or 24 hours if necessary.

EXAMPLE 4

20 ml. suspensions are prepared using the following formulations:

(a)

| | | |
|---|---|---|
| 6-methoxy-1-phenazinol 5,10-dioxide, cupric complex | mg | 20 |
| Carboxymethyl cellulose | percent | 2 |
| Methylparaben | do | 0.1 |
| Propylparaben | do | 0.025 |
| Distilled water, q.s. | | |

(b)

| | | |
|---|---|---|
| 6-methoxy-1-phenazinol 5,10-dioxide, cupric complex | mg | 30 |
| Carboxymethyl cellulose | percent | 2 |
| Methylparaben | do | 0.1 |
| Propylparaben | do | 0.025 |
| Tween 80 | do | 2 |
| Distilled water, q.s. | | |

(c)

| | | |
|---|---|---|
| 6-methoxy-1-phenazinol 5,10-dioxide, cupric complex | mg | 40 |
| Carboxymethyl cellulose | percent | 2 |
| Chlorobutanol | do | 0.5 |
| Distilled water, q.s. | | |

(d)

| | | |
|---|---|---|
| 6-methoxy-1-phenazinol 5,10-dioxide cupric complex | mg | 10 |
| Carboxymethyl cellulose | percent | 2 |
| Chlorobutanol | do | 0.5 |
| Tween 80 | do | 2 |
| Distilled water, q.s. | | |

Lactating cows are treated with 20 ml. of suspension in each infected quarter immediately after milking. The suspension is allowed to remain in the quarter until the next milking. The treatment is repeated at 24 hour intervals if necessary.

EXAMPLE 5

6-methoxy-1-phenazinol 5,10-dioxide, cupric complex—anti-mastitis preparation—0.1 percent

| | Grams/liter |
|---|---|
| 6-methoxy-1-phenazinol 5,10-dioxide, cupric complex | 1.00 |
| Polysorbate 80 (U.S.P.) | 60.00 |
| Sorbitan monooleate | 40.00 |
| Benzyl alcohol | 10.00 |
| Sodium acetate | 2.00 |
| Klucel H.A. | 19.00 |
| Distilled water q.s., 1 liter | |

Procedure

The 6-methoxy-1-phenazinol 5,10-dioxide, cupric complex and benzyl alcohol were triturated in a suitable size stainless steel container to form a paste. The Polysorbate 80, sorbitan monooleate and sodium acetate were slowly added in that order with constant stirring. The Klucel H.A. was dispersed in 850 ml. of distilled water at 50° C. and then cooled to 30° C. This was then added to the previous ingredients and stirred until homogeneous. The preparation was then brought to final volume with distilled water.

EXAMPLE 6

6-methoxy-1-phenazinol 5,10-dioxide, cupric complex—topical cream—0.1 percent

| Part I: | Grams per kilo mg. per gram |
|---|---|
| Stearyl alcohol | 125.00 |
| Petrolatum U.S.P. | 100.00 |
| Nipasol U.S.P. | 0.50 |
| Myrj 52 | 40.00 |
| Part II: | |
| 6-methoxy-1-phenazinol 5,10-dioxide, cupric complex | 1.00 |
| Distilled water | 612.00 |
| Propylene glycol | 120.00 |
| Nipogin | 2.00 |

Procedure (1) The stearyl alcohol, petrolatum, Nipasol and Myrj were heated in a suitable size stainless steel container to 75° C.

(2) The distilled water, propylene glycol and Nipogin were heated in a separate suitable size stainless steel container to 75° C. and stirred well. The 6-methoxy-1-phenazinol 5,10-dioxide, cupric complex was then added and stirred well.

(3) Part 2 was slowly added to Part 1 while slowly mixing with continuous stirring. The stirring was continued at low speed, using a Lightning Mixer, until the cream cooled to 35° C.

The cream was packaged in suitable size opal glass ointment jars.

Creams suitable for topical application according to the process of this invention will ordinarily contain from about 0.1 to about 1 percent by weight of active ingredient, preferably between about 0.1 and about 0.5 percent by weight.

What is claimed is:

1. A compound represented by the formula

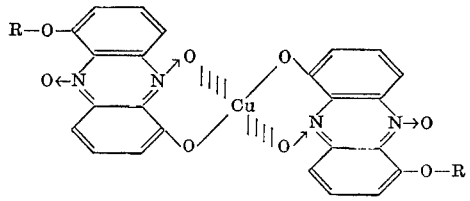

wherein R is lower alkyl.

2. The compound according to claim 1 wherein R is methyl.

3. The compound according to claim 1 wherein R is ethyl.

4. The compound according to claim 1 wherein R is propyl.

5. The compound according to claim 1 wherein R is methyl, in crystalline form.

References Cited

UNITED STATES PATENTS

| 3,052,677 | 9/1962 | Erner | 260—242 |
| 3,480,713 | 11/1969 | Johnston | 260—267 |

OTHER REFERENCES

Weigele et al., Tetrahedron Letters 1967, No. 8, pp. 715–8.

Yosioka et al., Chem. Pharmaceut. Bull. (Tokyo), vol. 6, pp. 688–92 (1958).

NATALIE TROUSOF, Primary Examiner

U.S. Cl. X.R.

260—267; 424—245